US012445702B2

United States Patent
Kaiser et al.

(10) Patent No.: US 12,445,702 B2
(45) Date of Patent: Oct. 14, 2025

(54) CAMERA MODULE

(71) Applicant: ELECTROLUX APPLIANCES AKTIEBOLAG, Stockholm (SE)

(72) Inventors: Kersten Kaiser, Rothenburg o. d. Tauber (DE); Christoph Luckhardt, Rothenburg o. d. Tauber (DE); Herbert Krug, Neustadt an der Aisch (DE); Heinz Sigler, Rothenburg o. d. Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 334 days.

(21) Appl. No.: 17/910,540

(22) PCT Filed: Mar. 4, 2021

(86) PCT No.: PCT/EP2021/055426
§ 371 (c)(1),
(2) Date: Sep. 9, 2022

(87) PCT Pub. No.: WO2021/180554
PCT Pub. Date: Sep. 16, 2021

(65) Prior Publication Data
US 2023/0131893 A1    Apr. 27, 2023

(30) Foreign Application Priority Data
Mar. 10, 2020    (EP) ..................................... 20161943

(51) Int. Cl.
*H04N 23/53*    (2023.01)
*H04N 23/51*    (2023.01)
(Continued)

(52) U.S. Cl.
CPC .......... *H04N 23/531* (2023.01); *H04N 23/51* (2023.01); *H04N 23/65* (2023.01); *H04N 23/66* (2023.01)

(58) Field of Classification Search
CPC ...... F24C 7/085; H04N 23/51; H04N 23/531; H04N 23/65; H04N 23/66
See application file for complete search history.

(56) References Cited

U.S. PATENT DOCUMENTS

2016/0182864 A1* 6/2016 Izawa ................ H04N 1/00347
                                                                348/143
2016/0366314 A1   12/2016 Pfaffinger, Jr.
(Continued)

FOREIGN PATENT DOCUMENTS

DE    102017203305    9/2018
EP    2515044    10/2012
(Continued)

OTHER PUBLICATIONS

International Search Report and Written Opinion for PCT/EP2021/055426, dated Mar. 24, 2021, 10 pages.

*Primary Examiner* — Amy R Hsu
(74) *Attorney, Agent, or Firm* — Chrisman Gallo Tochtrop LLC

(57) ABSTRACT

A camera module (10) for use in a household environment comprising plural household appliances is described. The camera module comprises: a camera (22); control circuitry (24) configured to control operation of the camera module (10) and to generate a data signal from images picked up by the camera (22); a transmitter (26) for wireless transmission of the data signal; a power supply (28) for powering the camera module (10); a housing (14) for accommodating the afore-mentioned components; and fixation means (15) provided at the housing (14) for removably mounting the (Continued)

camera module (10) selectively at any of the plural household appliances.

21 Claims, 2 Drawing Sheets

(51) Int. Cl.
*H04N 23/65* (2023.01)
*H04N 23/66* (2023.01)

(56) References Cited

U.S. PATENT DOCUMENTS

| | | | |
|---|---|---|---|
| 2017/0115545 A1* | 4/2017 | Yaney | G03B 11/043 |
| 2017/0261213 A1 | 9/2017 | Park et al. | |
| 2018/0133583 A1* | 5/2018 | Tran | G06F 3/00 |
| 2018/0372332 A1* | 12/2018 | Cha | G06F 3/147 |
| 2019/0289252 A1* | 9/2019 | Hugosson | H04N 23/54 |
| 2020/0065757 A1* | 2/2020 | Lee | G06Q 10/087 |
| 2020/0208915 A1* | 7/2020 | Käser | F27D 19/00 |
| 2024/0179389 A1* | 5/2024 | Bentley | F24C 15/006 |

FOREIGN PATENT DOCUMENTS

| | | |
|---|---|---|
| EP | 3321591 | 5/2018 |
| WO | 2017032515 | 3/2017 |

\* cited by examiner

CAMERA MODULE

The present invention is directed to a camera module, and in particular to a camera module to be used with household appliances.

Modern household appliances, and in particular household ovens, sometimes are equipped with camera devices for picking up images of the oven cavity so as to provide for the ability to send image data to a remote device, such as a tablet or a mobile phone, so that the user can survey a cooking process from a remote location.

In WO 2017/032515 A1 there is described a household oven having an oven door with a glass window and an oven door, wherein a digital camera is mounted in a door handle so as to obtain through the glass window of the door image data from within the oven cavity, which image data may be transmitted via a network interface to an external device, such as a user's mobile computer device so as to allow remote live visual monitoring of the cooking by the user.

While in household ovens it is common to have an oven door with a viewing window that has a size that approximates the open area of the oven cavity, in EP 2 515 044 A1 there is suggested a household oven in which instead of such a conventional viewing window there is provided a display to which image data from within the oven cavity are provided by a camera which is mounted in front of a small viewing window in the door, in which manner a higher insulation capacity of the door can be achieved.

It is an object of the present invention to provide for a camera module for use with a household appliance, which camera module provides for additional flexibility in use.

The camera module of the present invention is configured for use in a household environment comprising plural household appliances, wherein the camera module comprises:
  a camera;
  control circuitry configured to control operation of the camera module and to generate a data signal from images picked up by the camera;
  a transmitter for wireless transmission of the data signal;
  a power supply for powering the camera module;
  a housing for accommodating the afore-mentioned components; and
  fixation means provided at the housing for removably mounting the camera module selectively at any of the plural household appliances.

In contrast to known devices, the camera module of the present invention is configured as a stand-alone device which can be used which various household appliances, in particular kitchen appliances such as baking ovens, microwave ovens, food cookers, cooker hoods, refrigerators, and the like.

Thus, the camera module may be temporarily mounted at the door of a baking oven to provide picture data from the oven cavity during a cooking operation. When the cooking operation has been terminated and hence the camera module no longer is required at the oven, the camera module may be mounted at another appliance, such as in the interior of a refrigerator so as to provide picture data which may be used to determine the content of the refrigerator.

Thus, the power supply of the camera module may comprise a rechargeable battery.

To allow in such embodiments a charging of the battery without having to remove the battery from the camera module, the housing may further comprise at least one connector for connecting the rechargeable battery to a charging voltage.

In case that the battery is to be recharged while the camera module is not in use, by connecting the camera module to a standard charging device, the connector for connecting the rechargeable battery to a charging voltage can be configured as a plug socket, such as a micro USB socket, i.e. a USB-B socket or a USB-C socket, a DC socket such as a 2.1 mm socket, or the like.

On the hand, the camera module may be configured for being charged in a dedicated charging device, such as a charging station, in which case the connector for connecting the rechargeable battery to a charging voltage may comprise spaced contacts that are configured to engage contacts of the charging device.

In alternative embodiments of the camera module with rechargeable battery, the housing may house a coil for inductive coupling of the rechargeable battery to charging means. In such embodiments the camera module can be charged when being brought into proximity of the charging means and without having to provide for physical connections between the camera module and the charging means.

Given that one of the preferred uses of the camera module is to monitor a food preparation process that is carried out in an oven, wherein in order to avoid exposure of the camera module to high temperatures, the camera module preferably is mounted at the exterior side of the oven door where the camera takes images of the oven cavity by viewing through a window in the oven door, in preferred embodiments the camera module comprises a retractable or removable reflection shield that is provided at the housing. When mounting the camera module at an oven door, the reflection shield then can be used to avoid the camera images being distorted by reflection of ambient light at the over door window. On the other hand, when the camera module is employed at a household appliance where the reflection shield is not needed, such as in the interior of a refrigerator, the reflection shield thus can be retracted or removed.

Hence, in embodiments with a retractable reflection shield, the reflection shield can be configured to selectively be positioned in a first position in which the reflection shield is extended to shield the camera, or in a second position in which the reflection shield is retracted.

To this end, the reflection shield may comprise one or more retractable elements, such as one or more plate-like elements that can be displaced between the first and the second positions, such as one or more plate-like elements that can be shifted or rotated to be positioned aside the housing, and which when not in use are retracted to be positioned at least partially within the housing or to superimpose the housing such as by positioning at least a portion of the reflection shield underneath the housing.

The reflection shield can be configured for example as a fan-shaped element which ether comprises a continuous element having a plurality of foldable sections, or which comprises a plurality of individual lamella-type elements that can be spread to provide a shielding element.

In preferred embodiments, the camera module, in addition to the transmitter for wireless transmission of the data signal, also comprises a receiver for wireless reception of command signals for operation of the camera module. That is, whereas the camera module can be designed to operate according to an operation mode that is preselected before mounting or activating the camera in a household appliance, in more sophisticated embodiments the camera module is designed for reception of command signals from an exterior unit, such as the household appliance in which the camera module is mounted, a remote control unit, such as a server, a personal computer, a mobile phone or a dedicated control unit. In such embodiments, rather than operating the camera according to a predefined program or operation mode, the camera module can be activated in dependency of certain program parameters. For example when the camera module is used in an oven to monitor and optionally automatically control a cooking process, the camera unit could be automatically activated only when a certain temperature, humidity, duration etc. is reached.

Further, the camera module also can be activated on request by the user. In this manner, for example when the camera module is used to monitor a bread baking process, in an initial phase in which the oven is operated at a low temperature so as to allow the dough to rise, the camera can be switched off, or can be operated only in certain time intervals, or upon request by the user, and wherein during the actual baking process, at least towards the expected conclusion of the same, the camera is activated so as to monitor the degree of browning.

Hence, the camera module can comprise a controller that is configured to temporarily activate the camera module, wherein in between time intervals of activation the camera module is deactivated. The camera thus can be activated only for a short period of time sufficient to obtain picture date from the oven cavity whereupon the camera module is set into a sleep state so as to save power.

In a further aspect the present invention is a household appliance configured for use with a camera module as it is described above, wherein the household appliance comprises a socket for mounting the camera module.

Thus the camera module can be configured as an accessory item that is configured for use with the household appliance. The socket can be configured in various ways, such as a recess having a cross sectional shape that corresponds to the cross sectional shape of at least a section of the housing of the camera module, so that the camera module can be mounted simply by inserting the camera module into the recess. In other embodiments, the socket can be designed as a constructional element that provides for a form-fit with the camera module, such as an aperture which is designed to receive a corresponding projection provided at the camera module and which for mounting the camera module is inserted into the aperture.

To further secure the mounting of the camera module, there can be provided means for locking the camera module with respect to the household appliance, such as by providing for shapes of the aperture and the projection, in which the camera module assumes a first position or orientation in a first phase of the mounting process wherein then the position or orientation is changed to provide for a locking of the camera module with respect to the household appliance, such as by providing for a bayonet-like connection between the camera module and the household appliance.

The household appliance can be designed to have no visible features for mounting the camera module. That is, if the household appliance is configured as a holder, a plug socket, a slot or a recess for installation of the camera module, or the like, such socket can be provided at a position where it is not visible to a user, or can be provided with an element that allows to hide the socket, such as a cover.

In preferred embodiments, the socket can further comprise electrical connectors which when the camera module is mounted at the socket are in contact with connectors for connecting the rechargeable battery to a charging voltage. In such embodiments, the socket thus not only is designed to provide for mounting of the camera module, but at the same time provides for a charging connection via which a rechargeable battery of the camera module can be connected to a charging voltage.

In alternative embodiments, in which there shall be provided for a charging connection, the household appliance comprises a charging coil which is configured and positioned to induce a charging current in a coil of the camera module when the camera module is mounted at the socket.

The household appliance can be a household oven which comprises an oven muffle having an oven cavity, and a door for providing access to the oven cavity, wherein the door has a viewing window for the oven cavity and mounting means for mounting a camera module at the viewing window. In order to avoid that the camera is exposed to the harsh ambient conditions that prevail within an oven cavity, which oven may be, for example, an electric or gas-fired cooking or baking oven, a steamer, a microwave or a combined oven that is configured to be heated by different heating techniques, the household oven is designed for mounting the camera module at a location exterior to the cavity.

In embodiments in which the household appliance is a household oven, there can be provided a reflection shield which comprises a recess for accommodation of the camera module, a shield element for covering a portion of the oven door, a viewing window for the camera, and at least one clamp for clamping the reflection shield to a handle of the oven door. In such embodiments, the reflection shield thus can be configured as an accessory item which is designed as a shield element to be mounted at the door handle, and which accommodates the camera module.

In preferred embodiments of the household appliance the door comprises a handle and the mounting means of the camera module comprises at least one clamp for clamping the reflection shield to the handle of the oven door, so that for mounting the reflection shield to the handle no tools are required.

In such latter embodiments the door handle may comprise an elongate element that extends at a distance to the surface of the door, and the at least one clamp can be designed to be clamped between the oven door and the door handle. By providing for a clamping action between the oven door and the door handle, the mounting of the reflection shield to the oven door can be effected without clamping elements that extend about the door handle, but instead the clamping can be effected at the rear side of the handle where the clamping elements neither interfere with the gripping function nor with the appearance of the handle. To this end, the at least one clamp, when in the released state, can be designed to have a dimension measured orthogonal to the outer surface of the oven door which is larger than the distance of the door handle from the oven door. To provide for a locking of the reflection shield in the mounted state, the at least one clamp preferably is shaped such that during insertion of the clamp, the clamp is biased, and in the fully mounted position is at least partially released, so that for removal of the reflection shield a force is required to overcome the bias of the clamp.

The at least one clamp can have an abutment surface with which the clamp rests against the door handle, and the abutment surface can be shaped to be complementary to the cross-sectional shape of the door handle. Thus, for example when the door handle in the region where it makes contact with the clamp during mounting the reflection shield, has a convex shape, the clamp preferably has a corresponding concave shape that provides for a form-fit of the clamp with the door handle when in the mounted state of the reflection shield. In such embodiments the concave shape further may provide for a locking of the reflection shield when in the mounted state, to which end the clamp is designed such that for during inserting the reflection shield between door and door handle the clamp is deformed until the door handle snaps into the concave portion of the clamp.

When the reflection shield is designed as a substantially flat shield element, such as a generally rectangular flat element that is designed to be clamped between the oven door and the door handle, there can be provided two clamps between which there is located the viewing window for the camera.

In any of the above embodiments, the reflection shield can be designed as a single piece component, which preferably is made of a plastic material.

In embodiments wherein the door comprises a handle and the mounting means of the camera module comprises at least one clamp for clamping the reflection shield to the handle of the oven door, the handle can comprise a recessed charging contact and the at least one clamp can comprise a contact projecting from the clamp to contact the charging contact when the camera module is mounted at the door handle. In such manner, there can be provided for a charging connection when the camera module is mounted at the door handle, but wherein when the camera module has been removed, such as to mount the camera module at another household appliance, the charging contact at the door handle is hidden within the handle and does not interfere with the gripping function of the handle.

In such latter embodiments, the projecting contact further can act as positioning means to find the correct position for the camera module when mounting the camera module at the door handle.

In a further aspect, the present invention provides a household environment which comprises plural household appliances as they were described above, in combination with at least one camera module as described above, and a remote unit connected to, or comprising, a receiver for receiving the data signal from the transmitter, wherein the remote unit has at least one of a display and means for evaluating the data.

Depending on the type of household appliance in which the camera module is used, such as an oven, a steamer, a microwave, a cooker hood, a refrigerator, etc., the data that is transmitted from the camera module to the remote unit may be used for monitoring purposes, such as by sending image data to a user, such as for a user to visually monitor the progress of a cooking process carried out in an oven, to monitor by means of a camera module mounted to a cooking hood a cooking process carried out at a hob that is arranged below the hood, or to keep track of the contents of a refrigerator in which the camera module is used. Rather than sending the mere image data, the data captured by the camera also can be evaluated, such as for image data taken from an oven cavity by providing for a picture recognition to automatically determine the progress of a cooking process by determining the degree of browning of a food item, to automatically determine the kind of food being processed so as to provide the user with suggestions for the preparation of the food item etc. Furthermore, the data can be used to control the household appliance in which the camera module is used, such as by automatically changing a temperature setting or terminating a cooking process when a certain predetermined progress is reached.

To make use of such latter option, in preferred embodiments at least one of the household appliances comprises a receiver for receiving operational data from the remote unit, and the remote unit comprises a transmitter for wireless transmission of operational data from the said at least one household appliance.

Thus, in embodiments in which the camera module is used at an oven, operation parameters of the oven can be changed by the remote unit, such as to automatically adapt settings of the heating system, like setting the temperature, providing for steam addition, control additional heating elements, such as grill elements, venting the cavity to more rapidly reduce the oven temperature, terminate a cooking program etc.

As noted above, the remote unit can be configured to either automatically control oven settings based on an evaluation of the image data, or to change settings upon selection by the user. Thus, in preferred embodiments the remote unit has a user interface which allows to display images, to provide for an evaluation of the image data, and/or to allow the user to change settings of the household appliance. While the user interface can be configured as a dedicated input and display device, particularly when the remote unit is a smart phone, a computer or a tablet, the interface may be provided as application software (i.e. as app) that is run on the remote unit.

The operational data that are received at the household appliance from the remote unit also can be employed to trigger signaling functions, such as by providing an alarm in case that certain predefined conditions are reached.

A household environment as described above and which comprises at least one household appliance which is a household oven may comprise a receiver for receiving operational data from the remote unit, wherein the remote unit comprises a remote server configured to perform a picture evaluation, to determine oven settings based on the picture evaluation, and to transmit the determined settings to the oven.

The picture evaluation may comprise a picture recognition to detect the load within the cavity, so as to determine, for example, the type of food so as to suggest or automatically adjust oven settings, the size of a food item, such as the size of a roast based on which the processing time is calculated, or the size of dough based on which the onset a baking process is triggered, the color of a food item, such as a degree of browning. Further, the picture recognition also may be used to recognize hazardous conditions.

Based on the picture recognition that is performed by the server, the server either may provide information, such as results of the picture recognition, such as an expected time, when the food processing may be terminated, or suggestions for settings to be made. In the alternative, or additionally, based on the picture recognition the server may provide operational data to automatically change oven settings, such as to automatically terminate a cooking process.

As in the above embodiments, the server may have or may provide a user interface to allow a user to change settings, to control the operation of the household appliance, to display images received from the camera module, and/or to display an evaluation of the images, to display operational suggestions, such as suggested settings or preparation steps based on the evaluated images.

As in the above embodiments, the remote unit may comprise a personal computing device on which there is executed an application software which provides for at least one of display of image data from the camera, evaluation of image data, signaling functions, determination of operation settings based on an evaluation of image data, and adaptation of operation settings. The personal computing device can be a mobile phone, a tablet computer, a notebook or laptop computer, a personal computer, or a personal computing device that is part of a smart home system. In any such devices, the user interface can be provided as application software. While generally, the personal computing device can provide the same or similar functions as the server, the system also can be configured such that the personal computing device only is employed as display for the picture data received from the cavity, so that a user can monitor a food processing operation as if the user was standing in front of a conventional oven having a door window through which the oven cavity can be observed.

In any of the above device configurations, be it as camera module, as household appliance or as household environment, there can be provided various means for activation or deactivation of the camera module, such as a timer, i.e. a physical timer or a timer function implemented in a controller, an acceleration sensor for detecting a movement of a door of the household appliance, a light sensor positioned to sense light within the household appliance, an IR receiver provided in the camera module which is triggered by an IR signal provided by the household appliance, an activation unit for manual activation by a user, and/or a controller provided in the household appliance or the remote unit which is configured to communicate with the camera module. If in the latter embodiments the camera module communicates via a radio link, such as Bluetooth or wireless LAN, the system can be configured such that in an idle mode only a receiver unit is active, i.e. is operated in an "Always Connected" mode, but the remaining portions of the camera module are inactive or shut off, wherein the external device, such as a server, a mobile device or the household appliance itself, may activate, i.e. "wake up", the remaining system via a command that is received at the receiver unit.

Preferred embodiments of the present invention are described by reference to the drawings in which:

FIG. 1 shows a camera module 10 in accordance with the present invention which specifically is designed as a reflection shield that is adapted to be mounted at the door of a household oven, which oven comprises an oven door with a window looking into the oven cavity and a door handle that extends along an upper edge of the door above the window.

Figure 1:
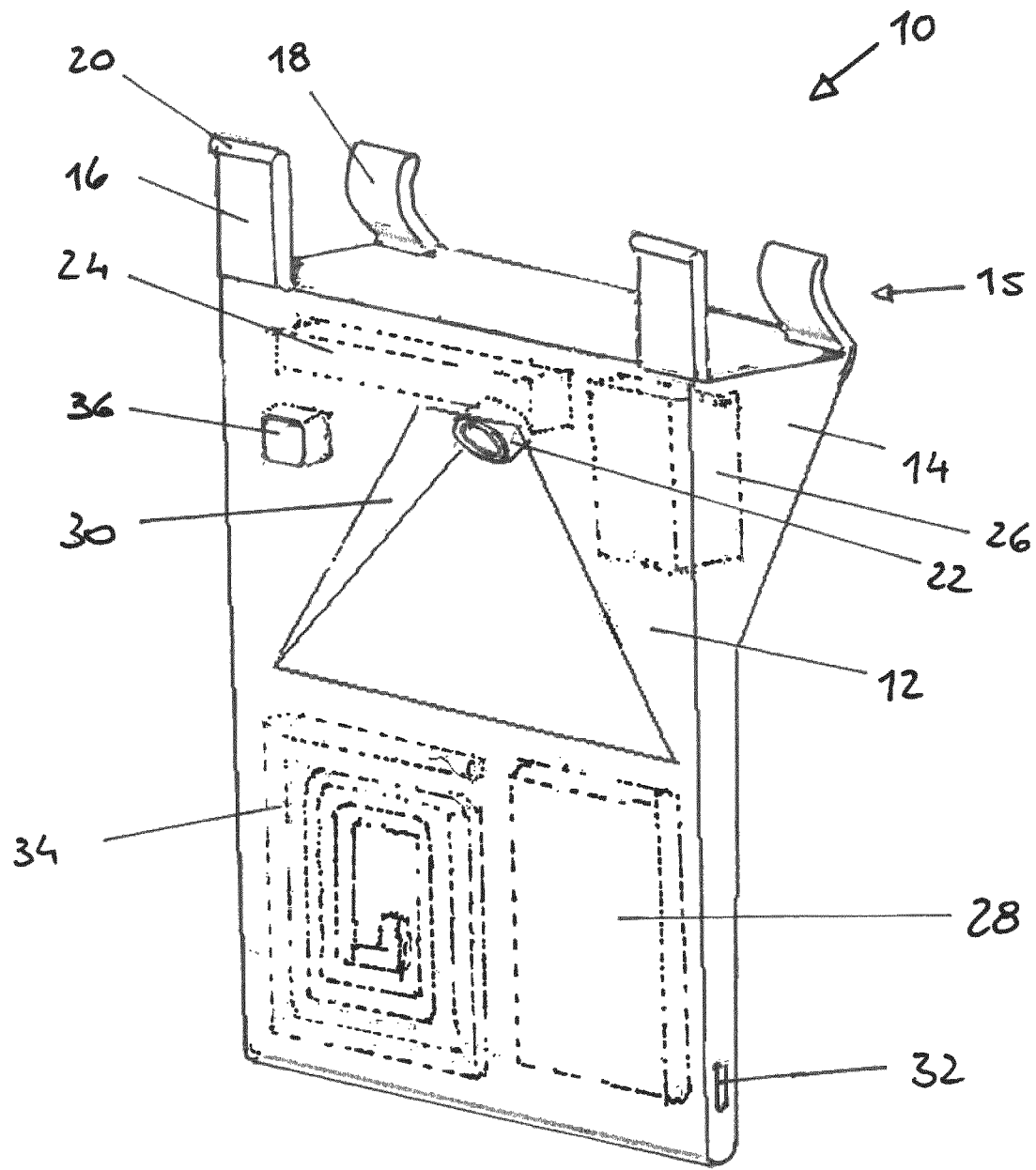
FIG. 1 illustrates an embodiment of a camera module in accordance with the present invention.

In the embodiment illustrated in FIG. 1, the camera module 10 is designed as an accessory unit that can used with various household appliances, such as ovens, cooker hoods, refrigerators and the like. With the camera module 10 of FIG. 1 being configured as a reflection shield, it is designed as a substantially flat component which may be made of a plastic material and which comprises a shield portion 12 which, when the camera module 10 is mounted at an oven door, faces the window of the oven door. The camera module 10 further comprises a housing portion 14 which in the embodiment shown in FIG. 1 is provided in an upper region of the camera module 10 opposite the shield portion 12.

It should be understood that the size and the shape of the reflection shield will be selected depending on the viewing angle of the camera, wherein the reflection shield should cover at least the area of the innermost glass pane of the oven door that is visible to the camera, so as to effectively block reflective light from reaching the camera.

At its upper end, the camera module 10 comprises clamps 15 for clamping the camera module to a door handle of the oven door. In particular, there are provided two pairs of clamps 15, each clamp pair comprising a straight clamp leg 16 configured to rest against the front face of the oven door and a curved clamp leg 18 configured to rest against the door handle. To provide for a vertical locking of the clamps 15 at the upper edge of the oven door, the straight clamp leg 16 comprises at its upper end a projecting claw 20 which when the camera module 10 is mounted at an oven door rests upon the upper edge of the over door, so as to prevent the camera module 10 from shifting downwards.

The housing portion 14 provides at its interior for space for accommodation of the various components of the camera module, including a camera 22, and, in FIG. 1 illustrated in phantom lines, control circuitry 24 configured to control operation of the camera module and to generate a data signal from images picked up by the camera 22, a transmitter 26 for wireless transmission of the data signal, and a power supply 28 for powering the camera module.

Since camera module 10 is configured for use with various different household appliances which may involve different ambient conditions in terms of temperature and humidity, housing portion 14 preferably provides for a sealed enclosure, such as by providing for a housing that is closed by welding.

In the embodiment shown in FIG. 1 the shield portion 12 which when the camera module is mounted to an oven door having a glass viewing window rests against the window pane so as to shut off ambient light comprises a funnel-shaped recess 30 in which there is mounted the lens of the camera 22.

Camera module 10 is powered by power supply 28 which preferably comprises a rechargeable battery, which may be charged by connecting the camera module 10 to a charging voltage, such as by cable via a plug socket 32. In preferred embodiments the camera module 10 is configured to be charged by a charging voltage that is provided by the household appliance at which the camera module 10 is mounted. To this end, there can be provided a charging coil 34 via which the camera module can be inductively coupled to a charger coil that is provided at the household appliance. In the alternative, the camera module 10 can be provided with charging contacts, that contact respective charger contacts of the household appliance, and which in the embodiment shown in FIG. 1 could be provided for example in one or both of the curved clamp legs 18 at the side facing the handle of the oven door.

Further, whereas in the embodiment shown in FIG. 1 the charging coil 34 is provided in the lower portion of the camera module 10, it also could be provided in the upper portion of the camera module 10, such as below the top wall of housing portion 14 so as to allow for an inductive coupling to a charging coil that is provided in the handle of the over door.

While the clamps 16 and 18 for of camera module 10 are specifically designed for mounting the camera module at the door of an oven, it should be understood that the camera module may be provided with additional mounting means for mounting the camera module 10 to at least one other type of household appliance. For example, the camera module 10 can be provided with a holder or clamp (not shown) for mounting the camera module 10 at the interior side of a door of a refrigerator, such as at or within one of the door shelves. Furthermore, for use of the camera module 10 in combination with a refrigerator, the camera module 10 may comprise a light sensor 36 configured to activate the camera module 10 when the refrigerator door is opened, by which also an interior lighting is switched on thus illuminating the interior of the refrigerator.

Figure 2:
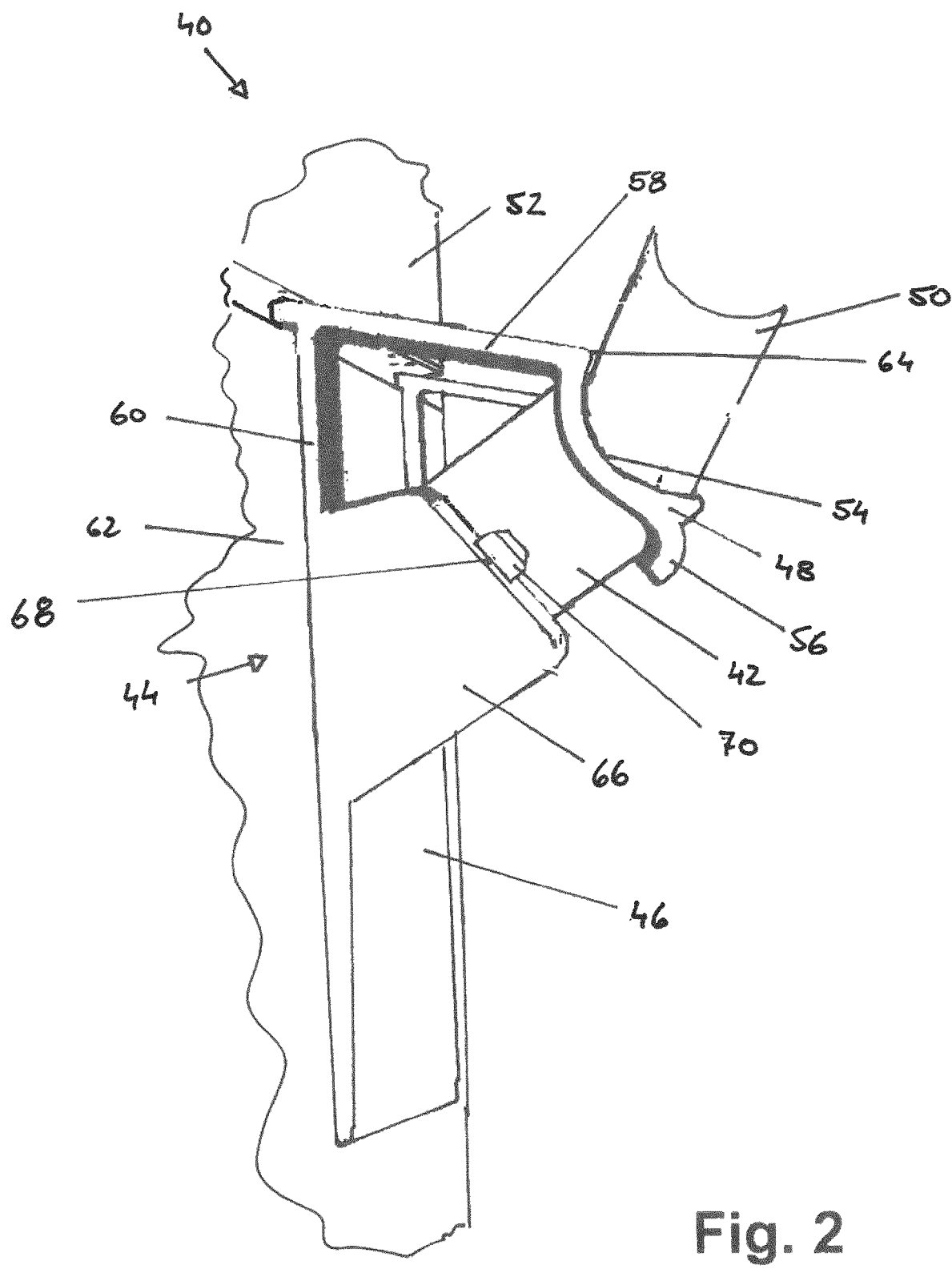
FIG. 2 illustrates a modified embodiment of a camera module in accordance with the present invention.

FIG. 2 shows an alternative embodiment of a camera module that is configured for use with an oven In this embodiment the camera module 40 comprises a central housing 42 which for use with an oven is releasably connected to a reflection shield 44 which in its lower part comprises a substantially flat shield element 46, and which in its upper part has two clamp elements 48 for clamping the reflection shield 44 to a handle 50 of an oven door 52, which in the embodiment shown in FIG. 2 is an elongate bar element of substantially circular cross-section which is mounted horizontally at the door 52.

Clamp elements 48 each comprise an abutment surface 54 the contour of which is complementary to that of door handle 50. Clamp element 48 at its lower free end comprises an engagement section 56 which is adapted to facilitate engagement by a user to apply a pushing force, by which the clamp element 48 can be bent away from the door handle 50 for removal of the reflection shield 44 from the handle. Thus, by applying a pushing force onto engagement section 56 an upper arm 58 is slightly bent towards a vertical portion 60 of reflection shield 44, which in the mounted state shown in FIG. 2 extends parallel to the window 62 of the oven door 52.

To facilitate mounting of the reflection shield 44 by inserting the reflection shield 44 into the gap formed between door handle 50 and the oven door 52, the upper arm 58 is attached to the vertical portion 60 so as extend slightly downwards. As can be seen in FIG. 2, clamp element 48 is shaped to extend beyond the point where the distance between the door handle 50 and the oven door 52 is at a minimum. Thus, in the embodiment shown in FIG. 2 in which the door handle 50 has a circular cross section, the abutment surface 54 of the clamp element 48 extends with its upper end 64 to a level that is above a horizontal line that extends through the center of the cross section of door handle 50, so that when the upper end 64 passes such level, the clamp at least partially releases to thus lock the clamp element 48 in place.

In the embodiment illustrated in FIG. 2, the reflection shield 44 in its lateral regions below the clamping elements 48 has a left and a right mount 66 each having a rail guide 68 for reception of a rail 70 of corresponding shape that is provided at the lateral sides of the center housing 42. Thus, when the camera module is to be used in connection with an oven, the central housing 42 which houses the various components of the camera module, including camera, control circuitry, transmitter and power supply, is combined with the reflection shield 44 by inserting the rails 70 of the central housing 42 into the rail guides 68 of the mounts 66 of the reflection shield 44.

As in the embodiment shown in FIG. 1, also in the embodiment illustrated in FIG. 2, the camera module is configured to be installed at a door handle 50 of an oven door 52 so as to be directed downwardly askew towards the window 62 of the oven door, so as to obtain a view of basically the entire oven cavity.

It is to be understood that the clamping action can be obtained by various shapes of the clamp, wherein an appropriate shape is selected in dependency of the cross sectional shape of the door handle. Thus, for example in case that the door handle has a rectangular shape, the clamp element 48 can be designed to have an abutment surface that is complementary to such rectangular shape, i.e. instead of the concave abutment surface 54 shown in FIG. 2, the clamp can be provided with an L-shaped abutment surface, which at its upper end further is provided with a short projection that acts as a lock to prevent the clamp from slipping downwards. Instead of providing a lock at the upper end of the abutment surface, there also could be provided a lock in an intermediate region of the abutment surface, such as a pin that projects outwardly from the abutment surface into a corresponding aperture or recess provided in the door handle.

Since in the embodiment illustrated in FIG. 2 the reflection shield and the central housing are configured for a releasable connection, in case that the camera module is to be employed with a different type of household appliance, the camera module thus can be disassembled by removing the central housing from the reflection shield, wherein then the central housing can be combined with another different mount that is adapted for mounting the camera module to the respective other type of household appliance.

Similarly as in the FIG. 1 embodiment, in the FIG. 2 embodiment the camera module may be powered by a rechargeable battery. While also the camera module of FIG. 2 could comprise a plug connection and/or an inductive coil for charging of the battery, in the embodiment of FIG. 2 the central housing 42 may comprise charging contacts at the side of the central housing 42 where in the mounted state it faces the handle 50 of the oven door. These charging contacts are configured to make electrical contact with contacts that are provided at the handle, preferably recessed with respect to the handle surface.

As explained above, the camera module is configured to obtain image data from the household appliance with which it is used, and to send such image data via a wireless connection, such as Wireless Local Area Network (WLAN), Bluetooth (BTLE) or similar techniques, to a central server or to a mobile device so as to provide for monitoring or control functions.

While the camera module can be designed to operate in accordance with a predetermined operation scheme that is stored within the camera module, which in the simplest case may provide for continuously obtaining image data, but which also may attain a series of different predefined operation states, the camera module also can be designed to be controlled based on, or at least also taking into consideration, data that is received at the camera module from a remote location, be it a remote control device, such as a controller of the household appliance with which the camera module is used, a central server, a mobile device, a dedicated control device or a smart home system, or another device providing input data, such as a sensor that provides sensor data to be used in controlling the camera module.

In preferred embodiments the camera module is driven by a multi processor/microcontroller system, which in order to save power operates the camera module only during intervals but else keeps the camera module in a sleep state. In such embodiments the camera module can be activated by different activation methods, such as by the use of a timer (be it a physical timer or a timing function provided by a controller) that periodically triggers the camera, by evaluating the signal obtained from various sensors, such as the signal provided by an acceleration sensor that measures opening and closing movements of the door of the appliance (for example in an oven or a refrigerator), the signal of a light sensor that is triggered by an interior light of the household appliance or ambient light (for example in an oven or a refrigerator), the signal of a proximity sensor for determining whether a user is present, a temperature sensor, a humidity sensor, etc.

LIST OF REFERENCE SIGNS

10 camera module
12 shield portion 14 housing portion
15 clamp
16 straight clamp leg
18 curved clamp leg
20 projecting claw
22 camera
24 control circuitry
26 transmitter
28 power supply
30 funnel-shaped recess
32 plug socket
34 charging coil
40 camera module
42 central housing
44 reflection shield
46 shield element
48 clamp element
50 handle
52 oven door
54 abutment surface
56 engagement section
58 upper arm
60 vertical portion
62 window
64 upper end of 54
66 mount
68 rail guide
70 rail

The invention claimed is:

1. Camera module for use in a household environment comprising plural household appliances, the camera module comprising:
 a camera;
 control circuitry configured to control operation of the camera module and to generate a data signal from images picked up by the camera;
 a transmitter configured for wireless transmission of the data signal;
 a power supply configured to power the camera module;
 a housing accommodating the aforementioned components; and
 fixation means provided at the housing configured to removably mount the camera module selectively at any of the plural household appliances.

2. The camera module of claim 1, wherein the power supply comprises a rechargeable battery.

3. The camera module of claim 2, wherein the housing further comprises at least one connector configured to connect the rechargeable battery to a charging voltage.

4. The camera module of claim 2, wherein the housing further houses a coil configured to inductively couple the rechargeable battery to charging means.

5. The camera module of claim 1, further comprising a retractable reflection shield provided at the housing.

6. The camera module of claim 1, further comprising a receiver configured to wirelessly receive command signals for operation of the camera module.

7. The camera module of claim 1, comprising a controller configured to temporarily activate the camera module such that in between time intervals of activation the camera module is deactivated.

8. A household appliance configured for use with the camera module of claim 1, the household appliance comprising a socket configured to mount the camera module.

9. The household appliance of claim 8, wherein the power supply of said camera module comprises a rechargeable battery, and the socket for mounting the camera module further comprises electrical connectors which when the camera module is mounted at the socket are in contact with connectors for connecting the rechargeable battery to a charging voltage.

10. The household appliance of claim 8, the power supply of said camera module comprising a rechargeable battery, the camera module further comprising a coil in said housing and configured to inductively couple said rechargeable battery to a charging coil; the household appliance further comprising said charging coil configured and positioned to induce a charging current in the coil of the camera module when the camera module is mounted at the socket.

11. The household appliance of claim 8, wherein the household appliance is a household oven comprising:
 an oven muffle having an oven cavity; and
 a door configured to provide access to the oven cavity, the door having a viewing window;
  said camera module having mounting means configured to mount the camera module at the viewing window.

12. The household appliance of claim 11, further comprising a reflection shield which comprises:
 a recess configured to accommodate the camera module;
 a shield element configured to cover a portion of the oven door,
 a viewing window for the camera; and
 at least one clamp configured to clamp the reflection shield to a handle of the oven door.

13. The household appliance of claim 12, wherein the mounting means of the camera module comprises rails affixed to the camera module and adapted to cooperate with rail guides on the reflection shield to combine the camera module with the reflection shield, which in turn is couplable to the handle of the oven door via said at least one clamp.

14. The household appliance of claim 13, wherein the door handle comprises an elongate element that extends at a distance to a surface of the door, and wherein the at least one clamp is configured to be clamped between the oven door and the door handle.

15. The household appliance of claim 11, said mounting means comprising at least one clamp, wherein a handle of said door comprises a recessed charging contact and the at least one clamp comprises a contact projecting from the clamp to contact the charging contact when the camera module is mounted at the door handle.

16. A household environment comprising:
 the camera module of claim 1;
 a plurality of household appliances each having a socket configured to mount the camera module; and
 a remote unit connected to, or comprising, a receiver configured to receive the data signal from the transmitter, the remote unit having at least one of a display and means for evaluating the data.

17. The household environment of claim 16, wherein at least one of the household appliances comprises a receiver for receiving operational data from the remote unit, the remote unit comprising a transmitter for wireless transmission of operational data from the said at least one household appliance.

18. The household environment of claim 17, said at least one household appliances being a household oven further comprising:
 an oven muffle having an oven cavity; and
 a door configured to provide access to the oven cavity, the door having a viewing window and mounting means configured to mount the camera module at the viewing window;

wherein the remote unit comprises a remote server configured to perform a picture evaluation, to determine oven settings based on the picture evaluation, and to transmit the determined settings to the household oven.

19. The household environment of claim 16, wherein the remote unit comprises a personal computing device having application software which provides for at least one of display of image data from the camera, evaluation of image data, signaling functions, determination of operation settings based on an evaluation of image data, and adaptation of operation settings.

20. The camera module of claim 7, wherein for activation or deactivation of the camera module there is provided at least one of:
  (a) a timer;
  (b) an acceleration sensor for detecting a movement of a door of a said household appliance;
  (c) a light sensor positioned to sense light within the said household appliance;
  (d) an IR receiver provided in the camera module which is triggered by an IR signal provided by the said household appliance;
  (e) an activation unit for manual activation by a user;
  (f) a controller provided in the said household appliance or the remote unit which is configured to communicate with the camera module.

21. A camera module assembly mountable at an exterior of an oven door of a household oven to visualize an interior of an oven cavity of the oven, the camera module comprising:
  a housing portion comprising a sealed housing and a shield portion comprising a reflection shield adapted to be disposed against an external surface of a viewing window of the oven door when the camera module is mounted at the exterior thereof;
  each of the following disposed within the sealed housing: a camera, control circuitry configured to control operation of the camera and to generate a data signal from images picked up thereby, a transmitter configured to wirelessly transmit said the data signal to a remote device, and a receiver configured to wirelessly receive command signals;
  a rechargeable battery configured to supply power to the camera;
  charging means configured to recharge the rechargeable battery, said charging means being selected from among a coil configured to be inductively coupled to an external charging coil connected to a voltage source, and one or more electrical contacts configured to be physically contacted by one or more external charging contacts connected to a voltage source; and
  a clamp comprising a first clamp leg configured to rest against said door and a second clamp leg configured to be complementary to a door handle that extends parallel to and is spaced a distance from said door, said second clamp leg being elastically deflectable from an undeflected condition in order to insert said clamp between the door and the door handle, whereupon the second clamp leg is further configured to elastically return to said undeflected condition, thereby reversibly fixing the clamp between the door and the door handle and mounting the camera module assembly at the exterior of said door;
  said camera being aligned at an askew angle relative to the reflection shield along a camera axis, such that when mounted at the exterior of said door, the camera axis will penetrate the viewing window and intersect a cooking position within the oven cavity located at an elevation different from the camera;
  said reflection shield extending over the viewing window at the elevation of said cooking position in order to inhibit light reaching the cooking position through the viewing window and being reflected back to the camera;
  said control circuitry being configured to activate the camera during discrete time periods such that the camera is deactivated during intervals between said discrete time periods, wherein the discrete time periods during which the camera is activated are determined based on the command signals wirelessly received by the receiver.

* * * * *